US008376499B2

(12) United States Patent
Flotats et al.

(10) Patent No.: US 8,376,499 B2
(45) Date of Patent: Feb. 19, 2013

(54) ADJUSTING MEASUREMENTS

(75) Inventors: Carles Flotats, Barcelona (ES); Marcos Casaldaliga, Sant Cugat del Valles (ES); Jordi Ferran Cases, Cerdanyola del Valles (ES); Raimon Castells De Monet, Barcelona (ES); David Toussaint, Barcelona (ES); Jonas Ingemar Åström, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1057 days.

(21) Appl. No.: 12/322,183

(22) Filed: Jan. 30, 2009

(65) Prior Publication Data

US 2010/0195121 A1 Aug. 5, 2010

(51) Int. Cl.
*B41J 29/393* (2006.01)
*G06F 3/12* (2006.01)

(52) U.S. Cl. ............................ 347/19; 358/1.1; 356/614

(58) Field of Classification Search ........................ None
See application file for complete search history.

(56) References Cited

U.S. PATENT DOCUMENTS

| | | | | |
|---|---|---|---|---|
| 6,177,214 | B1 | 1/2001 | Yokoyama et al. | |
| 6,834,928 | B2 | 12/2004 | Doval et al. | |
| 6,847,432 | B2 | 1/2005 | Osakabe et al. | |
| 6,929,342 | B2 | 8/2005 | Claramunt et al. | |
| 7,281,779 | B2 | 10/2007 | Haushahn et al. | |
| 7,391,525 | B2 | 6/2008 | Chapman et al. | |
| 2004/0056914 | A1 * | 3/2004 | Chun | 347/19 |
| 2005/0013647 | A1 | 1/2005 | Claramunt et al. | |
| 2006/0170723 | A1 | 8/2006 | Thiessen et al. | |
| 2008/0068420 | A1 | 3/2008 | Yanagisawa et al. | |
| 2009/0009751 | A1 * | 1/2009 | Taniguchi | 356/121 |

* cited by examiner

*Primary Examiner* — Marivelisse Santiago Cordero
*Assistant Examiner* — Huo Long Chen
(74) *Attorney, Agent, or Firm* — Garry A. Perry

(57) ABSTRACT

A system for adjusting measurements is disclosed. In one embodiment, the system includes an optical sensor having a window marked with two fiducials and at least one processor coupled to the optical sensor.

10 Claims, 5 Drawing Sheets

ADJUSTING MEASUREMENTS

BACKGROUND OF THE INVENTION

In some applications, the movement of a target should be relatively precisely measured and controlled. Failure to accurately measure movement of the target can cause device malfunction.

For example, in order for a printing device to create high-quality images, movement of paper and other types of media through the printing device should be relatively precisely measured and controlled. Failure to accurately measure movement of the media in an printing device can cause gaps or overlap in the resulting image as the image is formed on the media.

An optical sensor configured to capture images and measure distances can be used to measure advancement of the target. However, changes in the environment and related systems can cause the temperature of the optical sensor to change, and lead to thermal deformation of the elements making up the optical sensor. These temperature changes can distort the optics and cause the optical sensor to capture a deformed image of the target. The optics distortion and image deformation can cause the optical sensor to incorrectly measure the relative distances moved by the target.

BRIEF DESCRIPTION OF THE DRAWINGS

The accompanying drawings illustrate various embodiments of the principles described herein and are a part of the specification. The illustrated embodiments are merely examples and do not limit the scope of the claims. Throughout the drawings, identical reference numbers designate similar, but not necessarily identical elements.

DETAILED DESCRIPTION OF EMBODIMENTS

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an embodiment", "an example" or similar language means that a particular feature is included in at least that one embodiment, but not necessarily in other embodiments. The various instances of the phrase "in one embodiment" or similar phrases in various places in the specification are not necessarily all referring to the same embodiment. The terms "comprises/comprising", "has/having", and "includes/including" are synonymous, unless the context dictates otherwise.

Figure 1:
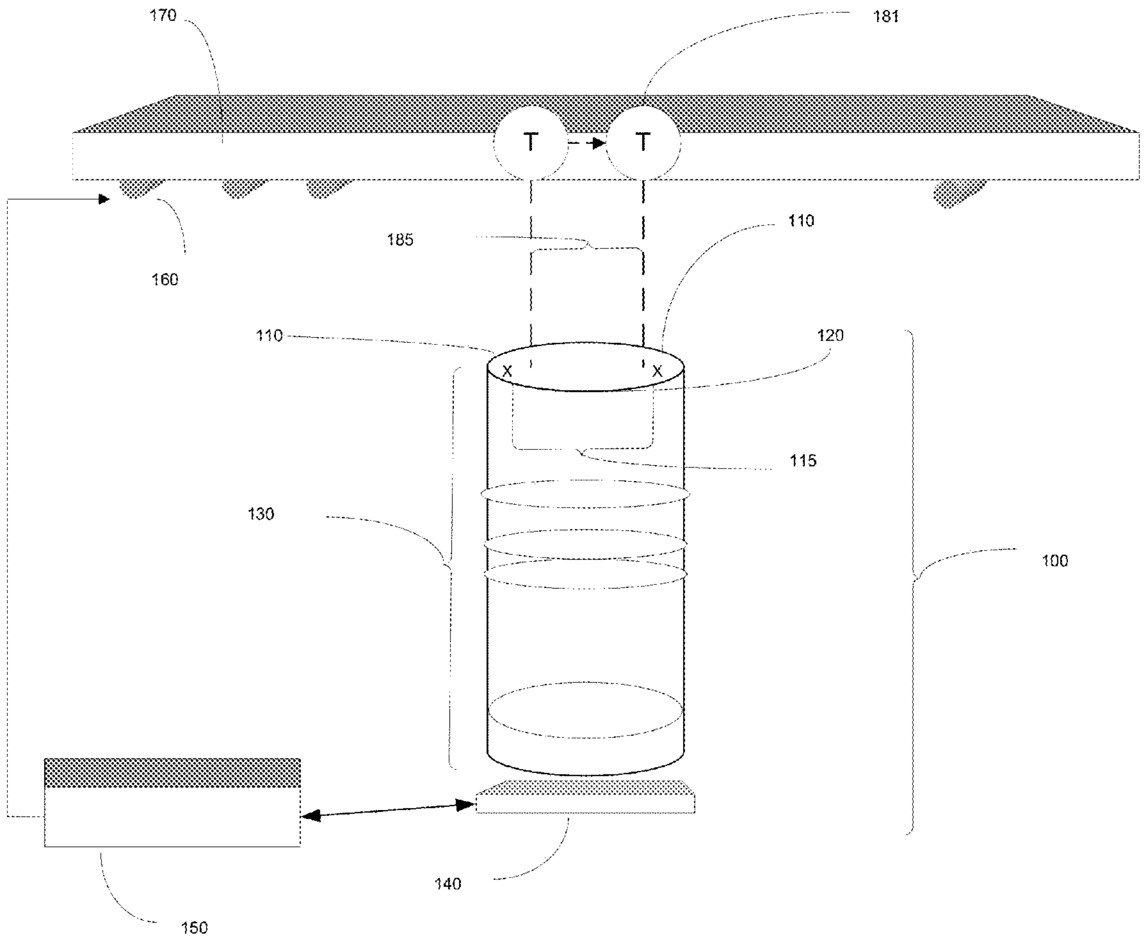
FIG. 1 is a diagram of a system for adjusting measurements in conjunction with a media advancing mechanism, in accordance with one embodiment of the invention.

FIG. 1 is a diagram of a system for adjusting measurements in conjunction with a media advancing mechanism, in accordance with one embodiment of the invention. The optical sensor 100 according to this embodiment includes fiducials 110, window 120, optical module 130, and image sensor 140. As used in the present specification and in the appended claims, the term "optical sensor" suggests a device that captures a digital image of a target 181. As used in the present specification and in the appended claims, the term "target" suggests a physical characteristic or other reference point on the object to be tracked. In an embodiment, two fiducials 110 are etched onto the window 120. As used in the present specification and in the appended claims, the term "window" suggests a hardened transparent surface that is a component of the optical sensor. In an embodiment, the optical sensor 100 has a hardened glass or plastic window 120 that is in contact with the back side of the paper or other media 170. As used in the present specification and in the appended claims, the term "fiducial" suggests a dot, spot, cross, or other geometrical shape or other visual feature that may be placed in the focal plain and used as a reference point for measuring. As used in the present specification and in the appended claims, the term "media" suggests paper or any other object that can be printed upon.

In an embodiment the optical module 130 contains an array of bright red light-emitting diodes (LEDs) to provide adjustable and uniform illumination, and a lens system and aperture plate to project an image onto the image sensor 140. As used in the present specification and in the appended claims, the term "image" suggests an optically formed duplicate or other reproduction of an object formed by a lens or mirror, stored in digital format. In an embodiment the image sensor 140 is designed for high-speed imaging and fast data transfer, controls the electronics for the optical sensor and LEDs, and contains an EEPROM with factory calibration data for the optical sensor and optics.

Optical sensor 100 connects to a processor 150. In an embodiment optical sensor 100 connects to the processor 150 by ribbon cable. As used in the present specification and in the appended claims, the term "processor" suggests logic circuitry that responds to and processes instructions so as to control a system. In an embodiment the optical sensor 100 and processor 150 are incorporated in a printing device having a media advancing mechanism 160. As used in the present specification and in the appended claims, the term "printing device" can represent an inkjet, LaserJet, or any other printer technology that enables images to be printed onto a hard copy surface.

In an embodiment the processor 150 is configured to determine the precise motion of the media 170 from images received from the optical sensor 100, and this information is used by the printing device's media advance system 160 to control the movement of the media 170. In an embodiment, the images are one pixel wide and 512 pixels long.

In an embodiment the optical sensor 100 and processor 150 are configured to compare the distance between fiducials 115 as measured at a "Time 1" in comparison to the measurement at "Time 2". The processor 150 can compensate for thermal deformations by adjusting the measurement of the distance that the target traveled 185 by a compensation factor that is a function of the difference between the distance between fiducials 115 as measured at Time 1 in comparison the distance between fiducials 115 as measured at Time 2. As used in the present specification and in the appended claims, the terms "deformed" and "distorted" are use interchangeably and suggest a feature that is poorly formed or out of shape compared to the original. In an embodiment, Time 1 is machine startup, and Time 2 is when the distance the target moved is measured.

In an embodiment the optical sensor 100 and processor 150 are incorporated in a sheet-fed scanning device having a media advancing mechanism 160. In an embodiment the optical sensor 100 and processor 150 are incorporated in a flatbed scanning device having a mechanism for advancing a scan head. In an embodiment the optical sensor 100 and processor 150 are incorporated in microscope having a mechanism for advancing a slide or object to be viewed or measured. In an embodiment the optical sensor 100 and processor 150 are incorporated in a digital measuring microscope having a mechanism for advancing a slide or object or object to be viewed or measured. In an embodiment the optical sensor 100 and processor 150 are incorporated in a precision microelectronic assembly machine having a mechanism for advancing an assembly or components to be placed, assembled or measured.

Figure 2:
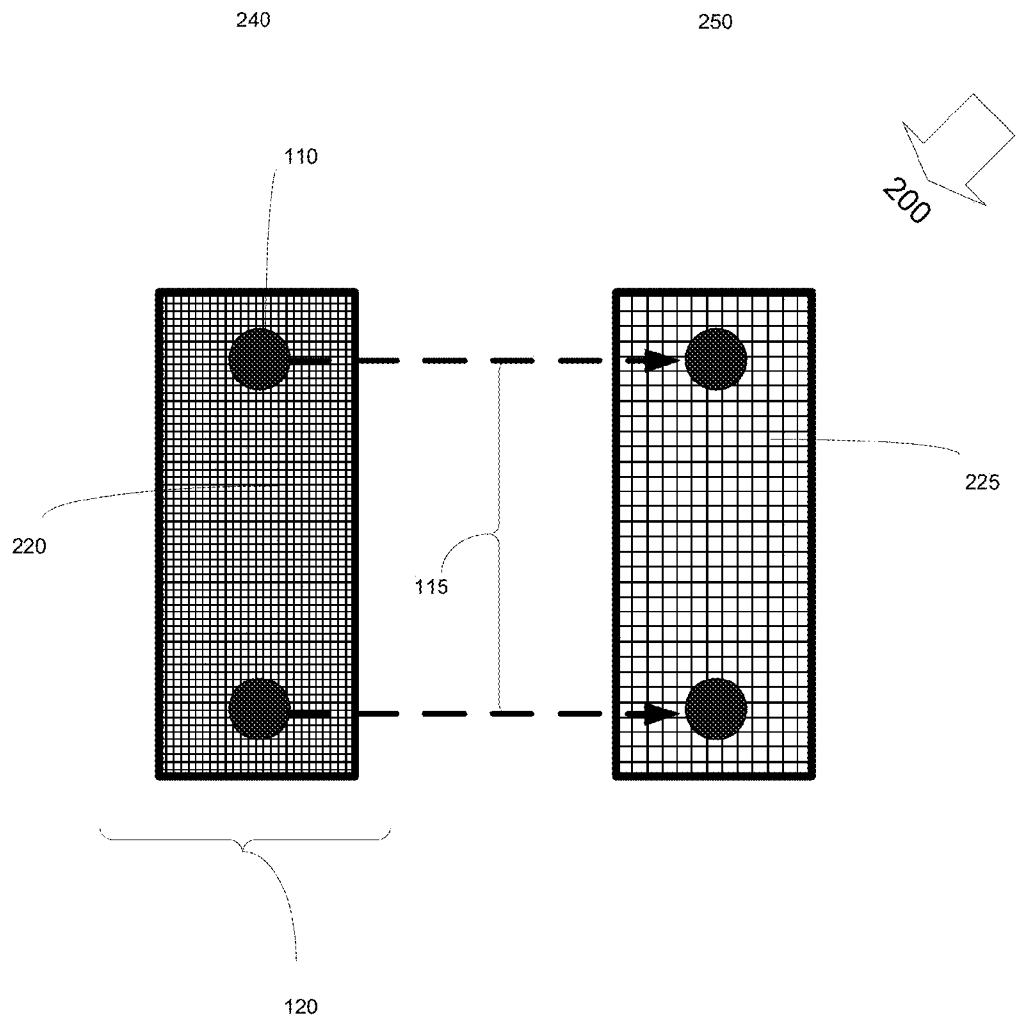
FIG. 2 is a diagram showing top views of a window of an optical sensor with fiducials, and an example of a media-advancement sensing scenario, according to an embodiment of the invention.

FIG. 2 is a diagram showing top views of a window 120 of an optical sensor with fiducials, and an example of a media-advancement sensing scenario, according to an embodiment of the invention. In an embodiment, despite the application of heat 200 to the optical sensor, the actual distance between fiducials 115 does not change appreciably due to the physical properties of the window 120. The application of heat does cause thermal deformation of the optics of the optical sensor, modifying the size of the measuring pixels from that of the original sensor pixel grid 220 to that of the distorted pixel size grid 225. Due to the change in the size of the pixels, measurements made using pixels will be different at Time 1 240 prior to the application of heat 200, as compared to Time 250 after the application of heat. In an embodiment, by remeasuring the distance between fiducials 115 with the distorted pixel size grid 225 and comparing to the measurement to the distance between fiducials as measured using the original sensor pixel grid 220, the processor may apply a compensation factor to the distance target traveled measurement FIG. 1 185.

Figure 3:
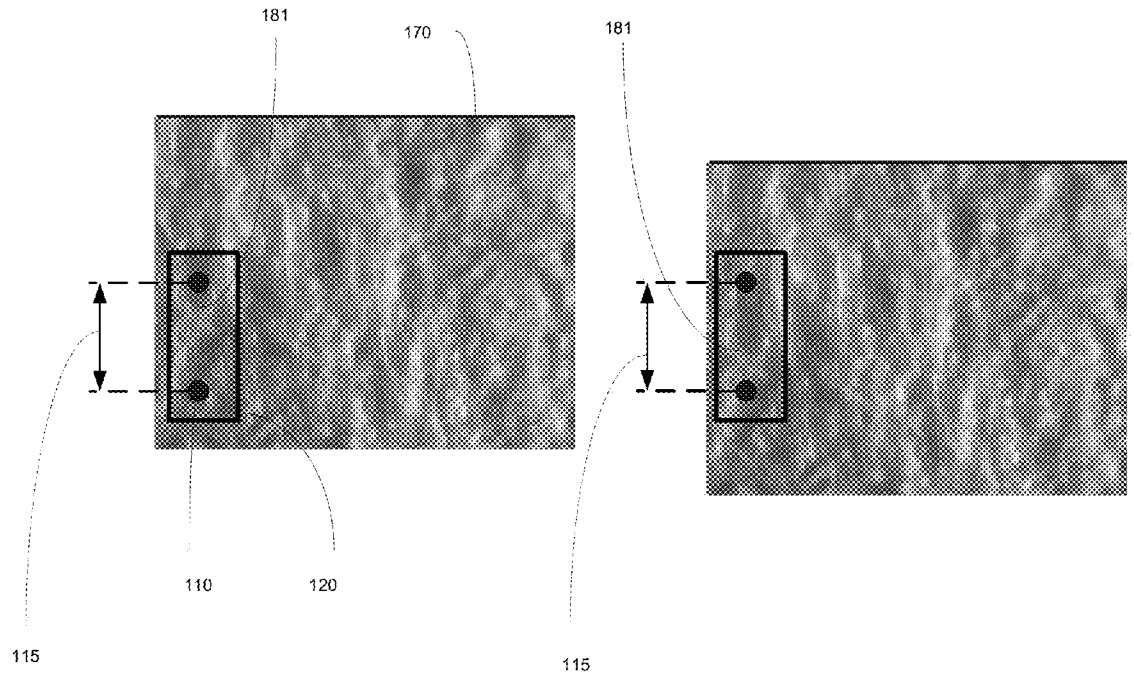
FIG. 3 is a diagram showing top views of a window of an optical sensor with fiducials at different times, and a scenario of measuring differences attributable to thermal deformation, according to an embodiment of the invention.

FIG. 3 is a diagram showing top views of a window 120 of an optical sensor 100 with fiducials 110 at different times, and a scenario of measuring differences attributable to thermal deformation, according to an embodiment of the invention. In an embodiment the media 170 moves below the field of view of the optical sensor 100 which contains the reference fiducials 110. In an embodiment the physical structure of the media 170 itself provides the target 181 used for position measurement, and therefore no printed tracking patterns or artificial marks are required to be made on the media. Such physical aspects of the media may include small scale (e.g. microscopic) features in the surface of the media. These may include fibers or characteristics caused by the process used to manufacture the media. In an embodiment the optical sensor captures digital images of the target at different times to track the advance of the media 170.

Figure 4:
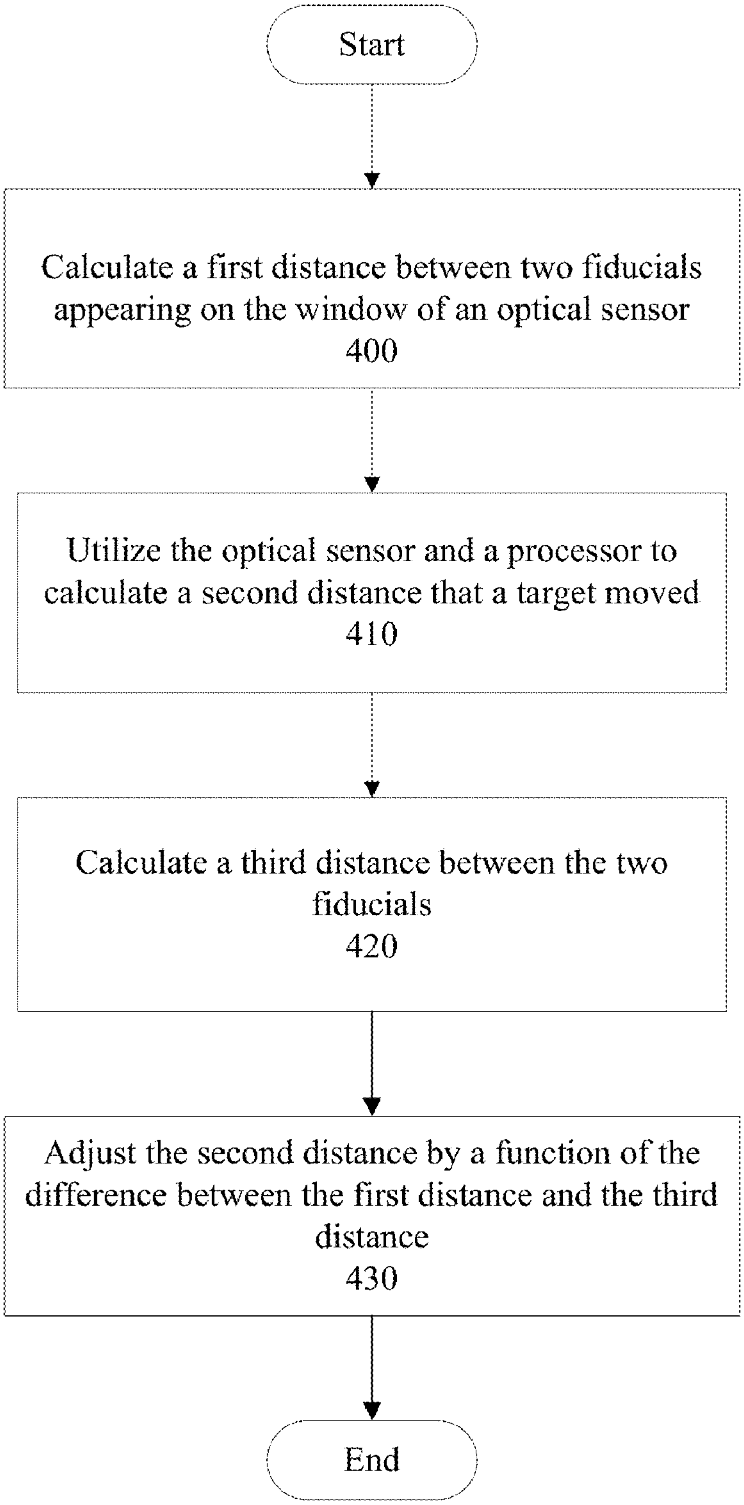
FIG. 4 is a flowchart of a method of adjusting measurements, according to an embodiment of the invention.

FIG. 4 is a flowchart of one embodiment of the invention, a method of adjusting measurements. The method of FIG. 4 begins at block 400 in which a first distance between two fiducials appearing on the window of an optical sensor is calculated. In an embodiment, this initial calculation would occur at machine startup.

The method continues at block 410 in which the optical sensor and a processor are utilized to calculate a distance that a target moved. In an embodiment, the target is media advancing through a printing device. In an embodiment, the target is a distinctive texture features on the back side of the media, so that measuring the distance the target moved will not require making marks on the media.

The method continues at block 420 in which a distance between the two fiducials is again calculated. In an embodiment, this recalculation could be triggered when the measured machine temperature reaching a threshold.

The method continues at block 430 in which the second distance is adjusted by a compensation factor that is a function of the difference between the first distance and the third distance. In an embodiment the compensation factor is the proportional difference between the first distance and the second distance.

An example of an application of the method is to employ the following expression: $D(c)=D(m)*D(if)/D(df)$. The value $D(if)$ is the initial distance between the fiducials. The value $D(df)$ is the distorted distance between the fiducials at the moment of measuring the distance to a target. The value $D(m)$ is the distance advanced by the target to be measured. The resulting value $D(c)$ is the corrected measurement of distance to the target. In an embodiment, value $D(c)$ may in turn be supplied to a processor or a mechanism that is advancing the target so as to more precisely control movement of the target.

Figure 5:
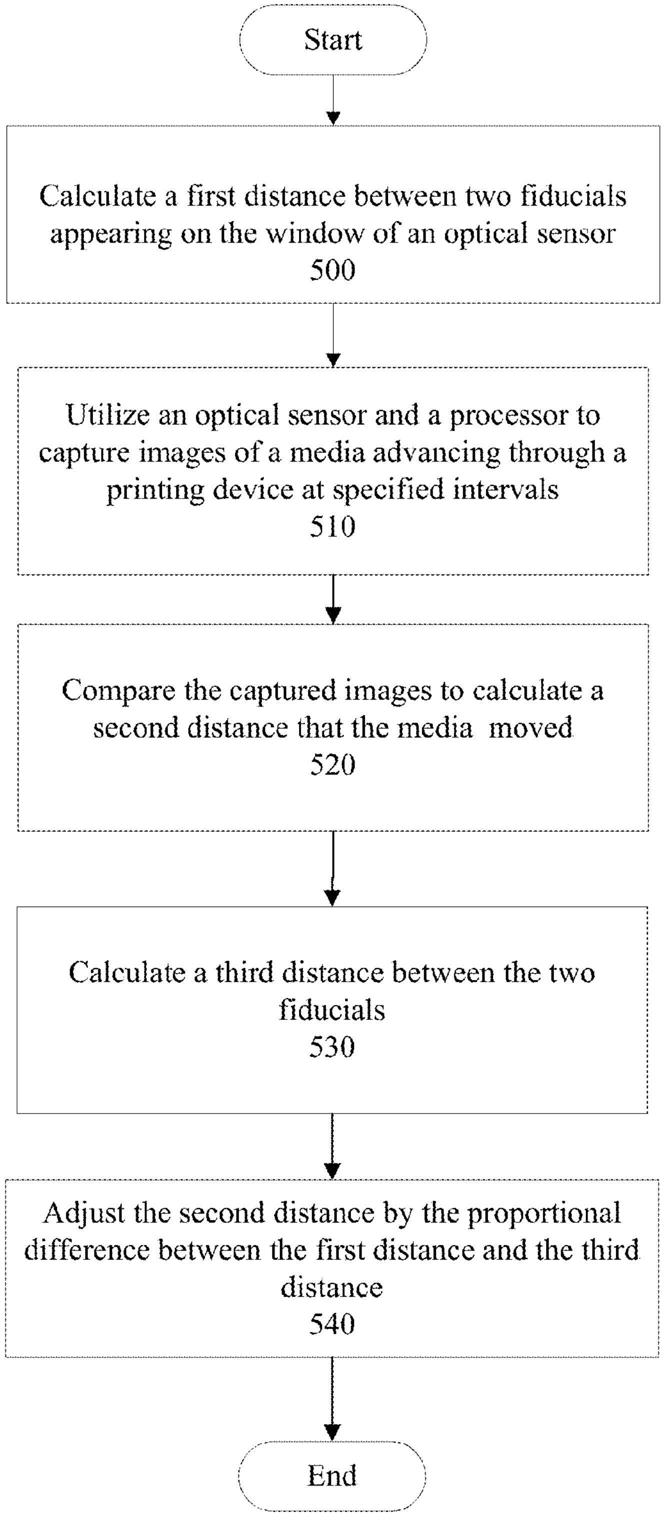
FIG. 5 is a second flowchart of a method of adjusting measurements, according to an embodiment of the invention.

FIG. 5 is a flowchart of one embodiment of the invention, a method of adjusting measurements that can be performed by a processor executing a computer-readable medium having computer executable instructions thereon. The method of FIG. 5 begins at block 500 in which a first distance between two fiducials appearing on the window of an optical sensor is calculated. In an embodiment the calculation of the distance is accomplished by measuring from the center of the fiducials. In an embodiment the calculation of the distance is accomplished by measuring from the edge of the fiducials.

The method continues at block 510 in which an optical sensor and a processor are utilized to capture images of a media advancing through a printing device at specified intervals.

The method continues at block 520 in which the captured images are compared to calculate a second distance that the media moved.

The method continues at block 530 in which a third distance between the two fiducials is calculated.

The method continues at block 540 in which the second distance is adjusted by the proportional difference between the first distance and the third distance.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for adjusting measurements, comprising:

calculating a first distance between two fiducials appearing on the window of an optical sensor; utilizing the optical sensor and at least one processor to calculate a second distance that a media advancing through a printing device, moved; calculating a third distance between the two fiducials; and adjusting the second distance by a compensation factor that is a function of the difference between the first distance and the third distance.

2. The method of claim 1, wherein the compensation factor is the proportional difference between the first distance and the third distance.

3. The method of claim 1, wherein the calculation of the second distance is accomplished by comparing images of the media captured by the optical sensor at specified intervals.

4. The method of claim 1, wherein the calculation of the second distance is made without making marks on the media.

5. A non-transitory computer-readable medium having computer executable instructions thereon which, when executed, cause at least one processor to perform a method for adjusting measurements, the method comprising:

calculating a first distance between two fiducials appearing on the window of an optical sensor; utilizing the optical sensor and at least one processor to calculate a second distance that a media advancing through a printing device, moved; calculating a third distance between the two fiducials; and adjusting the second distance by a compensation factor that is a function of the difference between the first distance and the third distance.

6. The medium of claim 5, wherein the compensation factor is the proportional difference between the first distance and the third distance.

7. The medium of claim 5, wherein the calculation of the second distance is accomplished by comparing images of the media captured by the optical sensor at specified intervals.

8. The medium of claim 5, wherein the calculation of the first distance and the third distance is accomplished by measuring from the edge of the fiducials.

9. The medium of claim 5, wherein the calculation of the first distance and the third distance is accomplished by measuring from the center of the fiducials.

10. The medium of claim 5, wherein the calculation of the second distance is made without making marks on the media.

* * * * *